(12) United States Patent
Park et al.

(10) Patent No.: US 8,841,026 B2
(45) Date of Patent: Sep. 23, 2014

(54) CATHODE, METHOD OF PREPARING THE SAME, AND LITHIUM BATTERY INCLUDING THE CATHODE

(75) Inventors: Kyu-sung Park, Suwon-si (KR); Seung-sik Hwang, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 253 days.

(21) Appl. No.: 13/050,040

(22) Filed: Mar. 17, 2011

(65) Prior Publication Data
US 2012/0045694 A1    Feb. 23, 2012

(30) Foreign Application Priority Data
Aug. 19, 2010 (KR) .................. 10-2010-0080412

(51) Int. Cl.
| H01M 4/13 | (2010.01) |
| H01M 4/50 | (2010.01) |
| H01M 4/505 | (2010.01) |
| H01M 4/525 | (2010.01) |
| H01M 4/131 | (2010.01) |
| C01G 45/12 | (2006.01) |
| C01G 51/00 | (2006.01) |
| H01M 4/36 | (2006.01) |
| C01G 53/00 | (2006.01) |

(52) U.S. Cl.
CPC ........... *H01M 4/131* (2013.01); *C01G 45/1228* (2013.01); *C01G 51/42* (2013.01); *C01P 2006/40* (2013.01); *H01M 4/505* (2013.01); *H01M 4/366* (2013.01); *H01M 4/525* (2013.01); *C01P 2002/52* (2013.01); *Y02E 60/122* (2013.01); *C01P 2002/85* (2013.01); *C01G 53/42* (2013.01); *C01G 53/50* (2013.01); *C01P 2002/54* (2013.01); *C01G 51/50* (2013.01); *C01G 53/54* (2013.01)
USPC .... 429/218.1; 429/223; 429/224; 429/231.95

(58) Field of Classification Search
None
See application file for complete search history.

(56) References Cited

U.S. PATENT DOCUMENTS

| 5,869,208 A | 2/1999 | Miyasaka |
| 2003/0082453 A1* | 5/2003 | Numata et al. .......... 429/231.95 |
| 2007/0099090 A1* | 5/2007 | Oh et al. ....................... 429/339 |
| 2008/0193841 A1* | 8/2008 | Sun et al. ..................... 429/220 |
| 2008/0311432 A1* | 12/2008 | Park et al. ......................... 429/5 |
| 2009/0253043 A1 | 10/2009 | Bak |

FOREIGN PATENT DOCUMENTS

| JP | 9-245836 | | 9/1997 |
| JP | 2001-148249 A | | 5/2001 |
| KR | 10-2003-0049924 | | 6/2003 |
| KR | 10-2009-0008870 | | 1/2009 |
| KR | 1020090008870 A | * | 1/2009 |
| KR | 10-2009-0106841 | | 10/2009 |

OTHER PUBLICATIONS

G.G. Amatucci et al., "Cobalt dissolution in $LiCoO_2$-based non-aqueous rechargeable batteries", Solid State Ionics 83 (1996), pp. 167-173.

* cited by examiner

*Primary Examiner* — Ula C Ruddock
*Assistant Examiner* — Daniel Gatewood
(74) *Attorney, Agent, or Firm* — Cantor Colburn LLP

(57) ABSTRACT

A cathode, a method of preparing the same, and a lithium battery including the cathode. The cathode includes: a current collector; a first cathode active material layer disposed on the current collector; and a second cathode active material layer disposed on the first cathode active material layer, wherein the first cathode active material layer comprises a lithium transition metal oxide having a layered structure, and the second cathode active material layer comprises a lithium transition metal oxide having a spinel structure and an average working potential of 4.5 V or more.

19 Claims, 3 Drawing Sheets

CATHODE, METHOD OF PREPARING THE SAME, AND LITHIUM BATTERY INCLUDING THE CATHODE

CROSS-REFERENCE TO RELATED APPLICATION

This application claims the benefit of Korean Application No. 10-2010-0080412, filed on Aug. 19, 2010 in the Korean Intellectual Property Office, the disclosure of which is incorporated herein by reference.

BACKGROUND

1. Field

Aspects of the present disclosure relate to cathodes, methods of preparing the same, and lithium batteries including the cathodes.

2. Description of the Related Art

For use in various small and high-performing devices, lithium batteries are required to have a high energy density, in addition to small-volume and lightweight characteristics. In addition, for use in electric vehicles, cyclic characteristics of a lithium battery at room temperature and at high temperature need to be regarded as a critical factor. To realize a lithium battery satisfying the characteristics described above, cathode active materials having various layered structures are being reviewed.

Lithium cobalt oxides are commercially available cathode active materials. Lithium cobalt oxides are expensive, have an effective capacity that is about 50% of their theoretical capacity, and have a driving voltage of about 4 V. An example of such lithium cobalt oxides is $LiCoO_2$.

Lithium nickel cobalt manganese oxides have an effective capacity that is similar to that of a lithium cobalt oxide, is inexpensive and highly stable, and have a driving voltage of about 4 V. An example of such lithium nickel cobalt manganese oxides is $LiNi_{1/3}Co_{1/3}Mn_{1/3}O_2$.

However, a transition metal is released from cathode active materials having layered structures during high-temperature driving. The release of the transition metal leads to a low charge and discharge efficiency and a short lifetime. Accordingly, there is a need to develop a method of suppressing the release of a transition metal at high temperature.

SUMMARY

Aspects of the present invention provide cathodes that suppress leakage of a transition metal at high temperature.

Aspects of the present invention provide lithium batteries that include the cathodes.

Aspects of the present invention provide methods of preparing the cathodes.

According to an aspect of the present invention, a cathode includes: a current collector; a first cathode active material layer disposed on the current collector; and a second cathode active material layer disposed on the first cathode active material layer, wherein the first cathode active material layer includes a lithium transition metal oxide having a layered structure, and the second cathode active material layer comprises a lithium transition metal oxide having a spinel structure and an average working potential of 4.5 V or more.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
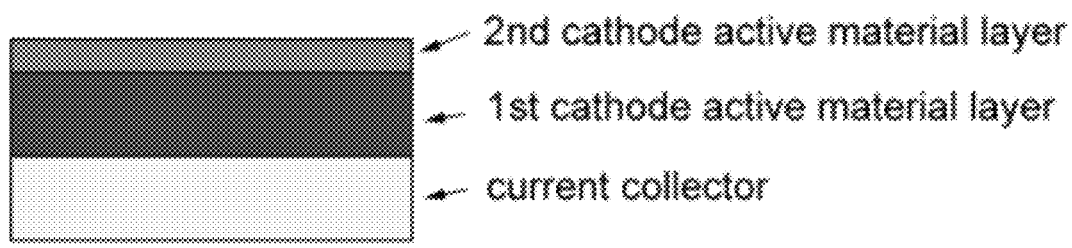
FIG. 1 is a cross-sectional view of a cathode according to an embodiment of the present invention.

Reference will now be made in detail to the present embodiments of the present invention, examples of which are illustrated in the accompanying drawings, wherein like reference numerals refer to like elements throughout. The embodiments are described below in order to explain the present invention by referring to the figures.

Hereinafter, cathodes, methods of preparing the same, and lithium batteries including the cathodes according to exemplary embodiments of the present invention will be described in detail.

A cathode according to an embodiment of the present invention includes a current collector; a first cathode active material layer disposed on the current collector; and a second cathode active material layer disposed on the first cathode active material layer, wherein the first cathode active material layer includes a lithium transition metal oxide having a layered structure and the second cathode active material layer includes a lithium transition metal oxide having a spinel structure and an average working potential of 4.5 V or more. The cathode may have, for example, a structure similar to that illustrated in FIG. 1.

The term 'average working potential' used herein refers to a value given by dividing electric power during charging and discharging by a current during charging and discharging when a battery is charged and discharged between upper and lower limits of the charge and discharge potential.

Due to the inclusion of the lithium transition metal oxide having the spinel structure, the second active material layer does not take part in the cathode reaction during charging and discharging and stays in an electrochemically inert state, thereby contributing to chemical stability of the lithium transition metal oxide having the layered structure included in the first cathode active material layer. That is, the second cathode active material layer may act as a protective layer for preventing a transition metal from being released from the first cathode active material layer.

Regarding the cathode, the lithium transition metal oxide having the layered structure may be represented by Formula 1 below:

$$Li_{1+x}Me_{1-x-y}A_yO_2 \qquad \text{<Formula 1>}$$

in which $-0.1 \leq x \leq 0.3$ and $0 \leq y \leq 0.1$; Me includes at least one metal selected from the group consisting of nickel (Ni), cobalt (Co), and manganese (Mn); and A includes at least one metal selected from the group consisting of aluminum (Al), chromium (Cr), magnesium (Mg), titanium (Ti), zirconium (Zr), and molybdenum (Mo).

For example, in particular, the lithium transition metal oxide having the layered structure may include at least one metal oxide selected from the group consisting of $LiCoO_2$, $LiNiO_2$, and $LiNi_vCo_wAl_yO_2$ ($0 \le v \le 0.95$, $0 \le w \le 0.5$, and $0 \le y \le 0.1$). For example, the lithium transition metal oxide having the layered structure may be $LiNi_{1-x-y}Co_xMn_yO_2$ ($0 \le y \le 0.5$ and $0 \le y \le 0.5$).

For example, the lithium transition metal oxide having the layered structure may be a complex oxide represented by $xLi_2MO_3 \cdot (1-x)LiMeO_2$ in which $0 < x < 1$, M includes at least one metal selected from the group consisting of manganese (Mn), titanium (Ti), zinc (Zr), tin (Sn), and molybdenum (Mo), and Me includes at least one selected from the group consisting of nickel (Ni), cobalt (Co), manganese (Mn), iron (Fe), aluminum (Al), magnesium (Mg), zinc (Zn), copper (Cu), chromium (Cr), vanadium (V), and niobium (Nb).

Regarding the cathode, the lithium transition metal oxide having the spinel structure having the average working potential of 4.5 V or more may be represented by Formula 2 below below:

$$Li_{1+a}Ni_{0.5+b}Mn_{1.5+c}M_dO_{4-e}M'_e \qquad \text{<Formula 2>}$$

in which $-0.2 \le a \le 0.2$, $-0.2 \le b \le 0.2$, $-0.2 \le c \le 0.2$, $0 \le d \le 0.5$, and $0 \le e \le 0.1$; M includes at least one metal selected from the group consisting of aluminum (Al), magnesium (Mg), titanium (Ti), zinc (Zr), vanadium (V), niobium (Nb), iron (Fe), zinc (Zn), silicon (Si), and Sn; and M' includes at least one element selected from the group consisting of nitrogen (N), sulfur (S), and fluorine (F).

For example, the lithium transition metal oxide having the spinel structure may be $LiNi_{0.5}Mn_{1.5}O_4$. Regarding the cathode, an average working potential of the lithium transition metal oxide having the spinel structure may be equal to or higher than 4.5 V.

In the cathode, a thickness of the second cathode active material layer may be equal to or less than 1/10 of that of the first cathode active material layer. For example, the thickness of the second cathode active material layer may be in a range of about 1/10 to about 1/1000 of that of the first cathode active material layer. In the cathode, the second cathode active material layer may completely cover the first cathode active material layer.

A method of preparing a cathode according to an embodiment of the present invention includes forming a first cathode active material layer on a current collector; and forming a second cathode active material layer on the first cathode active material layer, in which the first cathode active material layer has a lithium transition metal oxide having a layered structure and the second cathode active material layer has a lithium transition metal oxide having a spinel structure and an average working potential of 4.5 V or more.

In the method, the lithium transition metal oxide having the layered structure may be represented by Formula 1 below:

$$Li_{1+x}Me_{1-x-y}A_yO_2 \qquad \text{<Formula 1>}$$

in which $-0.1 \le x \le 0.3$ and $0 \le y \le 0.1$; Me includes at least one metal selected from the group consisting of nickel (Ni), cobalt (Co), and manganese (Mn); and A includes at least one metal selected from the group consisting of aluminum (Al), chromium (Cr), magnesium (Mg), titanium (Ti), zirconium (Zr), and molybdenum (Mo).

In the method, the lithium transition metal oxide having the spinel structure may be represented by Formula 2 below:

$$Li_{1+a}Ni_{0.5+b}Mn_{1.5+c}M_dO_{4-e}M'_e \qquad \text{<Formula 2>}$$

in which $-0.2 \le a \le 0.2$, $-0.2 \le b \le 0.2$, $-0.2 \le c \le 0.2$, $0 \le d \le 0.5$, and $0 \le e \le 0.1$; M includes at least one metal selected from the group consisting of aluminum (Al), magnesium (Mg), titanium (Ti), zinc (Zr), vanadium (V), niobium (Nb), iron (Fe), zinc (Zn), silicon (Si), and Sn; and M' includes at least one element selected from the group consisting of nitrogen (N), sulfur (S), and fluorine (F). In the method, the lithium transition metal oxide having the spinel structure may be $LiNi_{0.5}Mn_{1.5}O_4$.

An example of the method will now be described in detail. First, the lithium transition metal oxide having the layered structure, a conductive agent, a binder, and a solvent are mixed to prepare a first cathode active material composition. The first cathode active material composition may be directly coated on an aluminum current collector and dried to form a cathode plate including a first cathode active material layer. Alternatively, the first cathode active material composition may be cast on a separate support and the resulting film separated from the support is laminated on an aluminum current collector to form a cathode plate including a first cathode active material layer.

Then, the lithium transition metal oxide having the spinel structure and the average working potential of 4.5 V or more, a conductive agent, a binder, and a solvent are mixed to prepare a second cathode active material composition. The second cathode active material composition may be directly coated on the first cathode active material layer and dried, thereby forming a cathode plate that includes the first and second cathode active material layers sequentially formed. Alternatively, the second cathode active material composition may be cast on a separate support and a film separated from the support is laminated on the first cathode active material layer, thereby forming a cathode plate that includes the first and second cathode active material layers sequentially formed.

The conductive agent may be carbon black; graphite particles; natural graphite; artificial graphite; acetylene black; ketjen black; carbon fiber; metals such as copper, nickel, aluminum, or silver that are in the form of powder or fiber; or a polyphenylene derivative.

The binder may be a vinylidene fluoride/hexafluoropropylene copolymer; polyvinylidenefluoride, polyacrylonitrile, polymethylmethacrylate, polytetrafluoroethylene, and a mixture thereof; or a styrene butadiene rubber-based polymer, and the solvent may be N-methylpyrrolidone (NMP), acetone, or water. Amounts of the first and second cathode active materials, the conductive agent, the binder, and the solvent used herein may be the same levels as used in a traditional lithium battery.

A lithium battery according to an embodiment of the present invention includes the cathode. An example of a method of manufacturing the lithium battery will now be described in detail. First, a cathode is prepared as described above.

Then, as in the cathode plate preparation method, an anode active material, a conductive agent, a binder, and a solvent are mixed to prepare an anode active material composition, and the anode active material composition is directly coated on a copper current collector, thereby completely manufacturing an anode plate. Alternatively, the anode active material composition is cast on a separate support and the anode active material film separated from the support is laminated on a copper current collector, thereby completing manufacture of the anode plate.

The anode active material may not be particularly limited as long as it is conventionally used in the art. Examples of the anode active material are lithium metal, a metal that is alloyable with lithium, a transition metal oxide, a material that is used to dope or undope lithium, and a material that enables reversible intercalation and deintercalation of lithium ions.

Examples of the transition metal oxide are tungsten oxide, molybdenum oxide, titanium oxide, lithium titanium oxide, vanadium oxide, and lithium vanadium oxide. Examples of the material that is used to dope or undope lithium are silicon (Si), $SiO_x$ ($0<x<2$), Si-Q alloy (Q may be an alkali metal, an alkali earth metal, a Group 13 element, a Group 14 element, a transition metal, a rare-earth element, or a combination thereof, and may not be Si), Sn, $SnO_2$, and Sn—R (R may be an alkali metal, an alkali earth metal, a Group 13 element, a Group 14 element, a transition metal, a rare-earth element, or a combination thereof, and may not be Si), and at least one of these may be used in combination with $SiO_2$ for use as the anode active material. The elements Q and R may be magnesium (Mg), calcium (Ca), strontium (Sr), barium (Ba), scandium (Sc), yttrium (Y), titanium (Ti), zirconium (Zr), hafnium (Hf), vanadium (V), niobium (Nb), tantalum (Ta), chromium (Cr), molybdenum (Mo), tungsten (W), rhenium (Re), iron (Fe), lead (Pb), ruthenium (Ru), osmium (Os), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), or a combination thereof.

The material that enables reversible intercalation and deintercalation of lithium ions may be any one of various carbonaceous anode active materials that are conventionally used in a lithium battery. Examples of the material that enable reversible intercalation and deintercalation of lithium ions are crystalline carbon, amorphous carbon, and a mixture thereof. Examples of crystalline carbon are amorphous, plate, flake, spherical, or fiber-type natural graphite and artificial graphite; and examples of amorphous carbon are soft carbon (low-temperature calcined carbon), hard carbon, mesophase pitch carbide, and calcined coke.

The conductive agent, the binder, and the solvent of the anode active material composition may be the same as in a cathode. In another embodiment, each of the cathode active material composition and the anode active material composition may further include a plasticizer to form pores in the cathode or anode plate.

Amounts of the anode active material, the conductive agent, the binder, and the solvent used herein may be the same levels as used in a traditional lithium battery. According to the purpose and structure of the lithium battery, one or more of the conductive agent, the binder, and the solvent might not be used.

Then, a separator that is to be interposed between the cathode and the anode is prepared. The separator may be any one of various separators conventionally used in a lithium battery. The separator may have a low resistance to the flow of ions and a high electrolytic solution-retaining capability. Examples of the separator are glass fiber, polyester, polyethylene (PE), polypropylene, polytetrafluoroethylene (PTFE), and a combination thereof, and these separators may be in a non-woven or woven fabric form. For example, a separator suitable for a lithium ion battery may be a rollable separator formed of, for example, polyethylene or polypropylene, and a separator suitable for a lithium ion polymer battery may be a separator that has an excellent organic electrolytic solution-retaining capability.

An example of a method of forming the separator will now be described in detail. A polymer resin, a filler, and a solvent are mixed to prepare a separator composition. The separator composition may be directly coated on an electrode and dried to form a separator. Alternatively, the separator composition may be cast on a support and dried, and the resulting separator film may be separated from the support and may be laminated on an electrode, thereby forming a separator.

The polymer resin used in forming the separator may not be particularly limited and may be any one of various materials that are used as a binder of an electrode plate. Examples of the polymer are a vinylidenefluoride/hexafluoropropylene copolymer, polyvinylidenefluoride(PVDF), polyacrylonitrile, polymethylmethacrylate, and a mixture thereof.

Then, an electrolyte is prepared. The electrolyte may be an organic electrolytic solution. In addition, the electrolyte may instead be solid. Examples of the solid electrolyte are boron oxide and lithium oxynitride, but are not limited thereto. The solid electrolyte may be any one of various solid electrolytes used in the art. The solid electrolyte may be formed on the anode by, for example, sputtering.

For example, an organic electrolytic solution may be used as the electrolyte. The organic electrolytic solution may be prepared by dissolving a lithium salt in an organic solvent.

The organic solvent may be any one of various organic solvents used in the art. Examples of the organic solvent are propylene carbonate, ethylene carbonate, fluoroethylene carbonate, butylene carbonate, dimethyl carbonate, diethyl carbonate, ethylmethyl carbonate (EMC), methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyl-1,3-dioxolane, N,N-dimethylformamide, dimethylacetamide, dimethylsulfoxide, dioxane, 1,2-dimethoxyethane, sulfolane, dichloroethane, chlorobenzene, nitrobenzene, diethylene glycol, dimethylether, and a mixture thereof.

The lithium salt may be any one of various lithium salts used in the art. Examples of the lithium salt are $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (each of x and y is a natural number), LiCl, LiI, and a mixture thereof.

Figure 4:
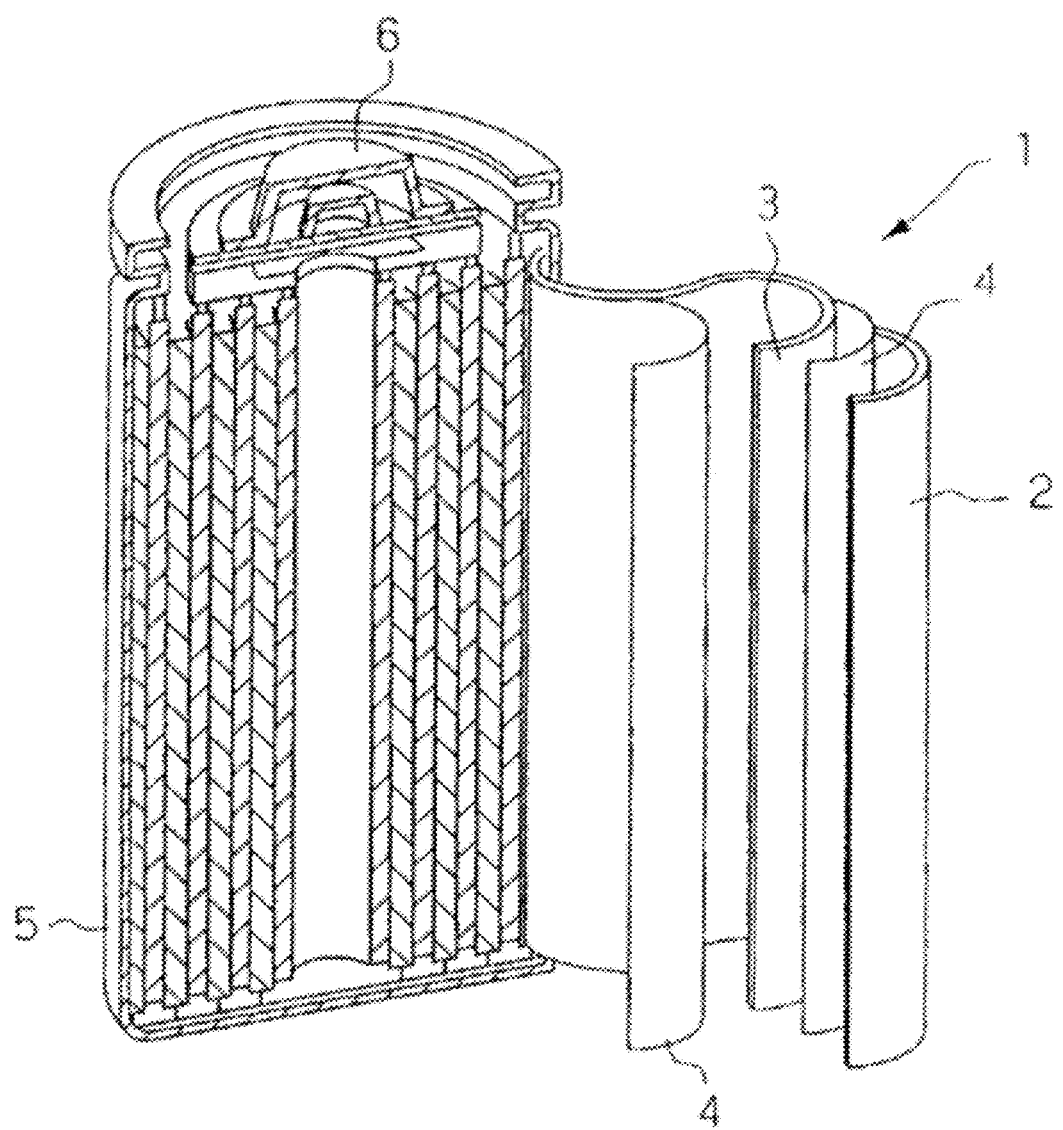
FIG. 4 is a schematic view of a lithium battery according to an embodiment of the present invention.

Referring to FIG. 4, a lithium battery 1 includes a cathode 3, an anode 2, and a separator 4. The cathode 3, the anode 2, and the separator 4 are wound or folded to be housed in a battery case 5. Then, an organic electrolytic solution is injected to the battery case 5 and the resultant structure is sealed with a cap assembly 6, thereby completely manufacturing of the lithium battery 1. The battery case may be cylindrical, rectangular, or a thin-film form. For example, the lithium battery may be a thin-film type battery. In another embodiment, the lithium battery may be a lithium ion battery.

Meanwhile, a battery assembly may be formed by interposing the separator between the cathode and the anode. A plurality of the battery assemblies may be stacked in a bi-cell structure, and then impregnated with an organic electrolytic solution, and the resultant structure is housed in a pouch and sealed, thereby completing manufacturing of a lithium ion polymer battery.

In addition, the battery assemblies may be stacked on each other to form a battery pack, and the battery pack may be used in high-capacity and high-performance devices, such as a notebook, a smart phone, an electric vehicle (EV), etc. Since the lithium battery has good charge and discharge efficiency characteristics and good lifetime characteristics at high temperature, the lithium battery is suitable for use in an EV. For example, the lithium battery is suitable for use in a hybrid vehicle such as a plug-in hybrid electric vehicle (PHEV).

One or more embodiments will now be described in further detail with reference to the following examples. These examples are for illustrative purpose only, and are not intended to limit the scope of the one or more embodiments.

(Preparation of Cathode)

Example 1

A mixture including $LiCoO_2$, a carbonaceous conductive agent (Super P), and polyvinylidenefluoride (PVdF) at a weight ratio of 96:2:2 was mixed with N-methylpyrrolidone (NMP) in an agate mortar to prepare a slurry. The slurry was coated on an aluminum current collector by using a doctor blade and dried at a temperature of 80° C. and then dried at a temperature of 120° C. under vacuum conditions, thereby forming a cathode plate including a first cathode active material layer having a thickness of about 50 μm.

A mixture including $LiNi_{0.5}Mn_{1.5}O_4$ and polyvinylidenefluoride (PVdF) at a weight ratio of 9:1 was mixed with N-methylpyrrolidone (NMP) to prepare a slurry. The slurry was coated to a thickness of about 3 μm on the first cathode active material layer by using a gravure coater and then dried at room temperature and then dried at a temperature of 120° C. under vacuum conditions, thereby forming a second cathode active material layer. Thus, a cathode plate including the first and second cathode active material layers sequentially formed was prepared. The cathode plate may have, for example, the structure illustrated in FIG. 1.

Example 2

A cathode plate was manufactured in the same manner as in Example 1, except that $LiNiO_2$ was used instead of $LiCoO_2$.

Example 3

A cathode plate was manufactured in the same manner as in Example 1, except that $LiNi_{1/3}CO_{1/3}Mn_{1/3}O_2$ was used instead of $LiCoO_2$.

Example 4

A cathode plate was manufactured in the same manner as in Example 1, except that $0.5Li_2MnO_3\text{-}0.5LiNi_{0.4}Co_{0.2}Mn_{0.4}O_2$ was used instead of $LiCoO_2$.

Comparative Example 1

A mixture including $LiCoO_2$, a carbonaceous conductive agent (Super P), and polyvinylidenefluoride (PVdF) at a weight ratio of 96:2:2 was mixed with N-methylpyrrolidone (NMP) in an agate mortar to prepare a slurry. The slurry was coated on an aluminum current collector by using a doctor blade and dried at room temperature and then dried at a temperature of 120° C. under vacuum conditions, thereby forming a cathode plate including a first cathode active material layer.

Manufacturing Lithium Batteries

Example 5

A coin cell was manufactured using the cathode plate prepared according to Example 1; lithium metal as an opposite electrode; a PE separator; and an electrolyte prepared by dissolving 1.3M $LiPF_6$ in a mixed solvent including ethylene carbonate (EC), diethylene carbonate (DEC), and ethylmethyl carbonate (EMC) in a volumetric ratio of 3:5:2. The coin cell was used to evaluate the release of a transition metal during charging at high temperature and at high voltage.

Example 6

A coin cell was manufactured in the same manner as in Example 5, except that the cathode plate prepared according to Example 2 was used instead of the cathode plate prepared according to Example 1.

Example 7

A coin cell was manufactured in the same manner as in Example 5, except that the cathode plate prepared according to Example 3 was used instead of the cathode plate prepared according to Example 1.

Example 8

A coin cell was manufactured in the same manner as in Example 5, except that the cathode plate prepared according to Example 4 was used instead of the cathode plate prepared according to Example 1.

Comparative Example 2

A coin cell was manufactured in the same manner as in Example 5, except that the cathode plate prepared according to Comparative Example 1 was used instead of the cathode plate prepared according to Example 1.

Example 9

A coin cell was manufactured using the cathode plate prepared according to Example 1; graphite as an anode; a PE separator; and an electrolyte prepared by dissolving 1.3M $LiPF_6$ in a mixed solvent including ethylene carbonate (EC), diethylene carbonate (DEC), and ethylmethyl carbonate (EMC) in a volumetric ratio of 3:5:2. The coin cell was used to evaluate charging and discharging at high temperature.

Example 10

A coin cell was manufactured in the same manner as in Example 9, except that the cathode plate prepared according to Example 2 was used instead of the cathode plate prepared according to Example 1.

Example 11

A coin cell was manufactured in the same manner as in Example 9, except that the cathode plate prepared according to Example 3 was used instead of the cathode plate prepared according to Example 1.

Example 12

A coin cell was manufactured in the same manner as in Example 9, except that the cathode plate prepared according to Example 4 was used instead of the cathode plate prepared according to Example 1.

Comparative Example 3

A coin cell was manufactured in the same manner as in Example 9, except that the cathode plate prepared according to Comparative Example 1 was used instead of the cathode plate prepared according to Example 1.

Evaluation Example 1

XPS Test

Lithium batteries manufactured according to Example 5 and Comparative Example 2 were charged with a constant current rate of 0.05 C at a temperature of 60° C. until the voltage reached 4.5 V with respect to the lithium metal. Then, the lithium batteries were dissembled and an X-ray photoelectron spectroscopy (XPS) test was performed on surfaces of the lithium opposite electrodes. The results are shown in FIG. 2.

Figure 2:
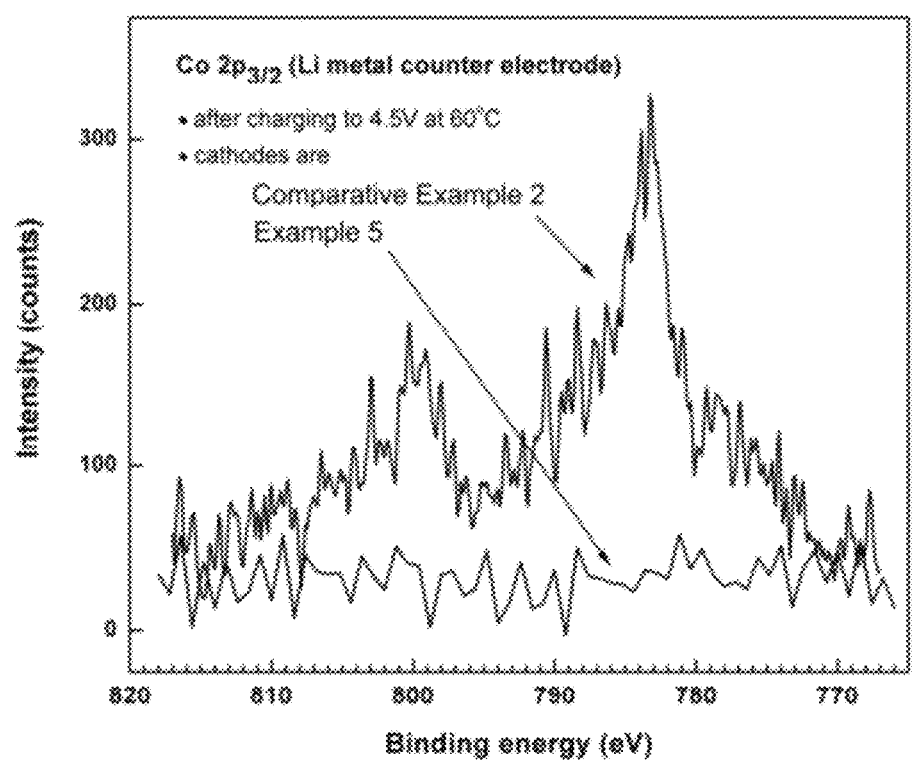
FIG. 2 shows X-ray photoelectron spectroscopy (XPS) test results of lithium metal used as an opposite electrode after coin cells manufactured according to Example 5 and Comparative Example 2 are charged at high temperature.

As illustrated in FIG. 2, the amount of cobalt present at the surface of the lithium opposite electrode was much smaller in the coin cell manufactured according to Example 5 than in the coin cell manufactured according to Comparative Example 2. That is, the release of cobalt was substantially suppressed in the cathode included in the coin cell of Example 5 compared to the cathode included in the coin cell of Comparative Example 2.

Evaluation Example 2

Charge and Discharge Test

Figure 3:
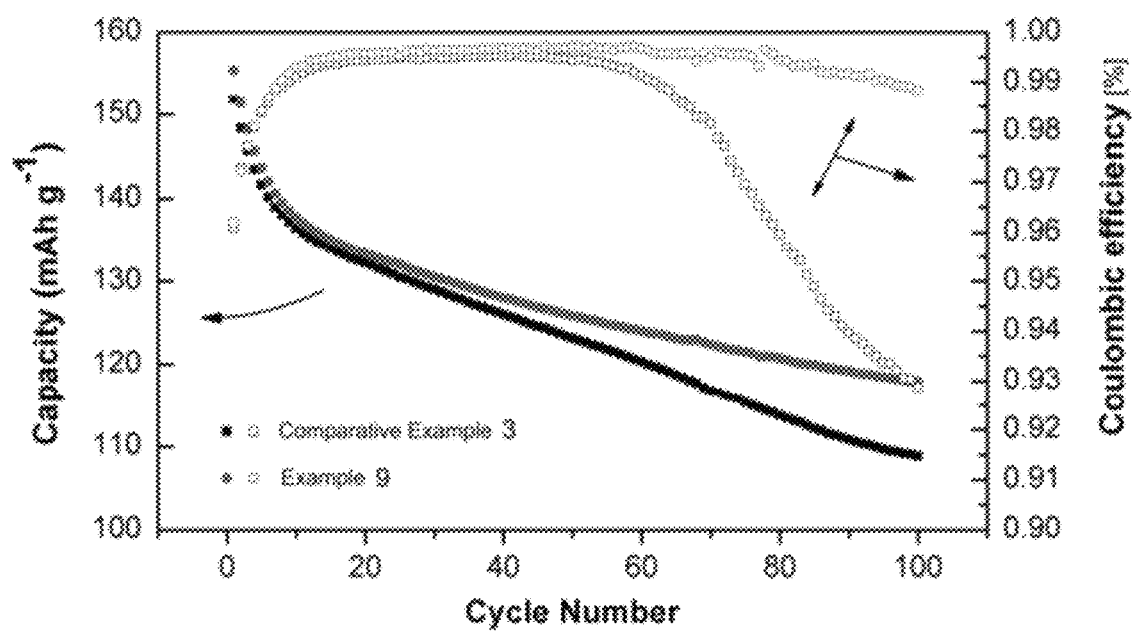
FIG. 3 shows charge and discharge test results of lithium batteries manufactured according to Example 9 and Comparative Example 3.

The coin cells manufactured according to Example 9 and Comparative Example 3 were charged and discharged 100 times with a constant current rate of 0.5 C in a voltage range of about 3 to 4.4 V at a temperature of 60° C. The high-temperature charge and discharge test results are shown in FIG. 3. In FIG. 3, the left graph is of a discharge capacity and the right graph is of a charge and discharge efficiency. The charge and discharge efficiency at a temperature of 60° C. is calculated by Equation 1 below:

Charge and discharge efficiency [%]=discharge capacity/charge capacity×100 <Equation 1>

Referring to FIG. 3, the coin cell of Example 9 has higher capacity and charge and discharge efficiency than the coin cell of Comparative Example 3. That is, the coin cell of Example 9 has a longer lifetime than the coin cell of Comparative Example 3.

As described above, according to the one or more of the above embodiments of the present invention, due to inclusion of an active material including a cathode active material having a spinel structure in a cathode, a lithium battery including the cathode may have high efficiency and a long lifetime.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. A cathode comprising:
a current collector;
a first cathode active material layer disposed on the current collector; and
a second cathode active material layer disposed on a surface of the first cathode active material layer opposite the current collector,
wherein the first cathode active material layer comprises a lithium transition metal oxide having a layered structure, and the second cathode active material layer comprises a lithium transition metal oxide having a spinel structure and an average working potential of 4.5 V or more,
wherein the lithium transition metal oxide having the spinel structure is represented by Formula 2 below:

$Li_{1+a}Ni_{0.5+b}Mn_{1.5+c}M_dO_{4-e}M'_e$ <Formula 2> in which −0.2≤a≤0.2, −0.2≤b≤0.2, −0.2≤c≤0.2, 0≤d≤0.5, and 0≤e≤0.1; M includes at least one metal selected from the group consisting of aluminum (Al), magnesium (Mg), titanium (Ti), zinc (Zr), vanadium (V), niobium (Nb), iron (Fe), zinc (Zn), silicon (Si), and tin (Sn); and M' includes at least one element selected from the group consisting of nitrogen (N), sulfur (S), and fluorine (F),
wherein the cathode has a coulombic efficiency of greater than 94% after 100 cycles when cycled at a temperature higher than 25° C., and
wherein the lithium transition metal oxide of the second cathode active material layer is not charged or discharged during charging and discharging of the cathode.

2. The cathode of claim 1, wherein the lithium transition metal oxide having the layered structure is represented by Formula 1 below:

$Li_{1+x}Me_{1-x-y}A_yO_2$ <Formula 1> in which −0.1≤x≤0.3 and 0≤y≤0.1; Me includes at least one metal selected from the group consisting of nickel (Ni), cobalt (Co), and manganese (Mn); and A includes at least one selected from the group consisting of aluminum (Al), chromium (Cr), magnesium (Mg), titanium (Ti), zirconium (Zr), and molybdenum (Mo).

3. The cathode of claim 1, wherein the lithium transition metal oxide having the layered structure comprises at least one metal oxide selected from the group consisting of $LiCoO_2$, $LiNiO_2$, and $LiNi_vCo_wAl_yO_2$ (0≤v≤0.95, 0≤w≤0.5, and 0≤y≤0.1).

4. The cathode of claim 1, wherein the lithium transition metal oxide having the layered structure comprises $LiNi_{1-x-y}Co_xMn_yO_2$ (0≤x≤0.5 and 0≤y≤0.5).

5. The cathode of claim 1, wherein the lithium transition metal oxide having the layered structure comprises $xLi_2MO_3 \cdot (1-x)LiMeO_2$ in which 0≤x≤1, M includes at least one metal selected from the group consisting of manganese (Mn), titanium (Ti), zinc (Zr), tin (Sn), and molybdenum (Mo), and Me includes at least one metal selected from the group consisting of nickel (Ni), cobalt (Co), manganese (Mn), iron (Fe), aluminum (Al), magnesium (Mg), zinc (Zn), copper (Cu), chromium (Cr), vanadium (V), and niobium (Nb).

6. The cathode of claim 1, wherein the lithium transition metal oxide having the spinel structure comprises $LiNi_{0.5}Mn_{1.5}O_4$.

7. The cathode of claim 1, wherein the thickness of the second cathode active material layer is 1/10 or less of that of the first cathode active material layer.

8. The cathode of claim 1, wherein the second cathode active material layer completely covers the first cathode active material layer.

9. A method of forming a cathode, the method comprising:
forming a first cathode active material layer on a current collector; and forming a second cathode active material layer on a surface of the first cathode active material layer opposite the current collector, wherein the first cathode active material layer comprises a lithium transition metal oxide having a layered structure, and the second cathode active material layer comprises a lithium transition metal oxide having a spinel structure and an average working potential of 4.5 V or more, wherein the lithium transition metal oxide having the spinel structure is represented by Formula 2 below:

$$Li_{1+a}Ni_{0.5+b}Mn_{1.5+c}M_dO_{4-e}M'_e \qquad \text{<Formula 2>}$$

in which $-0.2 \leq a \leq 0.2$, $-0.2 \leq b \leq 0.2$, $-0.2 \leq c \leq 0.2$, $0 \leq d \leq 0.5$, and $0 \leq e \leq 0.1$; M includes at least one metal selected from the group consisting of aluminum (Al), magnesium (Mg), titanium (Ti), zinc (Zr), vanadium (V), niobium (Nb), iron (Fe), zinc (Zn), silicon (Si), and tin (Sn); and M' includes at least one element selected from the group consisting of nitrogen (N), sulfur (S), and fluorine (F), and wherein the cathode has a coulombic efficiency of greater than 94% after 100 cycles when cycled at a temperature higher than 25° C., and wherein the lithium transition metal oxide of the second cathode active material layer is not charged or discharged during charging and discharging of the cathode.

10. The method of claim 9, wherein the lithium transition metal oxide having the layered structure is represented by Formula 1 below:

$$Li_{1+x}Me_{1-x-y}A_yO_2 \qquad \text{<Formula 1>}$$

in which $-0.1 \leq x \leq 0.3$ and $0 \leq y \leq 0.1$; Me includes at least one metal selected from the group consisting of nickel (Ni), cobalt (Co), and manganese (Mn); and A includes at least one metal selected from the group consisting of aluminum (Al), chromium (Cr), magnesium (Mg), titanium (Ti), zirconium (Zr), and molybdenum (Mo).

11. The method of claim 9, wherein the lithium transition metal oxide having the spinel structure comprises $LiNi_{0.5}Mn_{1.5}O_4$.

12. A lithium battery comprising the cathode of claim 1.
13. A lithium battery comprising the cathode of claim 2.
14. A lithium battery comprising the cathode of claim 3.
15. A lithium battery comprising the cathode of claim 4.
16. A lithium battery comprising the cathode of claim 5.
17. A lithium battery comprising the cathode of claim 6.
18. A lithium battery comprising the cathode of claim 7.
19. A lithium battery comprising the cathode of claim 8.

* * * * *